Patented Oct. 26, 1948

2,452,460

UNITED STATES PATENT OFFICE 2,452,460

SEPARATION OF 1-CYANOBUTADIENE-1,3 FROM ACETIC ACID BY AZEOTROPIC DISTILLATION

Virgil L. Hansley, Niagara Falls, N. Y., assignor to E. I. du Pont de Nemours & Company, Wilmington, Del., a corporation of Delaware No Drawing. Application March 9, 1945, Serial No. 581,928

2 Claims. (Cl. 202—42)

This invention relates to the recovery of chemical products, more particularly to the recovery of chemical products from mixtures containing a carboxylic acid and especially to the recovery of 1-cyanobutadiene-1,3 and analogous compounds from mixtures containing acetic acid.

In the separation of chemical products from mixtures containing a carboxylic acid ordinary methods of distillation may frequently be employed. However, when the boiling point of the compound to be recovered is close to, or somewhat higher than, the boiling point of the acid other methods of recovery often must be utilized, especially in the case of compounds which easily polymerize or are unstable to prolonged heating. In some cases steam distillation may be utilized and in others the acid may be neutralized with an alkali such as soda ash and the desired product then recovered by distillation from the salt solution formed.

The former method of recovery involves the introduction of large volumes of water which must later be separated from the product. Also, the introduction of water may cause the formation of other aqueous azeotropes which complicate further the separation. Furthermore, compounds which are easily hydrolyzed may be thus acted upon by the large amount of water introduced by these methods. The latter method, that is, neutralization with alkali, also usually requires the addition of large volumes of water and the salt formed on neutralization may cause polymerization or hydrolysis of the product. For example, in the recovery of 1-cyanobutadiene-1,3 from mixtures containing acetic acid ordinary distillation cannot be utilized since the product readily polymerizes when heated for a period sufficiently long to distill off the acetic acid. This tendency to polymerize is aggravated by the presence of water. Attempts to utilize the neutralization technique usually result in substantial hydrolysis of the product with consequent loss in yield.

It is one of the objects of this invention to provide a method for the recovery of chemical products from mixtures containing a carboxylic acid. Another object is to provide a method for the recovery of chemical products which are unstable to heat or which polymerize upon prolonged heating, from mixtures containing acetic acid. A further object is to recover 1-cyanobutadiene-1,3 from mixtures containing acetic acid.

The above objects are attained in accordance with my invention by the addition of a tertiary amine to the mixture of the desired product containing acetic acid and distilling the desired product from the resulting mixture.

I have found that when a tertiary amine capable of forming a high boiling azeotrope with a carboxylic acid is added to a mixture containing these acids, the desired chemical product may be distilled directly from the mixture, thus avoiding prolonged heating, addition of salt forming compounds, or the introduction of water.

My invention may be best illustrated by the ensuing description of my novel process as applied to the recovery of 1-cyanobutadiene-1,3. One method of producing this compound involves the pyrolysis of crotonaldehyde cyanhydrin acetate, and this method results in a mixture of the 1-cyanobutadiene-1,3 with relatively large amounts of acetic acid. In recovering the 1-cyanobutadiene-1,3 in accordance with my novel process, triethylamine in the proportion of one mole for each 4 moles of acetic acid (or 18.7% by weight) present may be added to the mixture in a still equipped with a fractionating column. The mixture is then heated and the 1-cyanobutadiene-1,3 boiling at 140° C. at atmospheric pressure distills off leaving behind the tertiary amine acetic acid azeotrope which boils at approximately 162° C. at atmospheric pressure. Preferably the distillation is carried out in a vacuum. For example, I have found it desirable to subject the mixture to distillation at about 40 millimeters of mercury. Under these conditions the 1-cyanobutadiene-1,3 distills off at about 57–58° C. while the amine-carboxylic acid azeotrope, boiling at 91–92° C., remains behind. It is thus possible to recover the 1-cyanobutadiene-1,3 in high yields with substantially no hydrolysis or polymerization.

The amine utilized in my novel process may be easily recovered and re-utilized. Recovery of the amine and also of the acetic acid or other carboxylic acid can be accomplished by first adding to the residue obtained after distilling off the 1-cyanobutadiene-1,3 or other chemical product, dry HCl equivalent to the amine present. This sets free the carboxylic acid which can then be distilled in anhydrous form from the triethylamine hydrochloride which is formed by the addition of hydrogen chloride. When substantially all of the acid has been recovered, aqueous caustic equivalent to the amine present is added to the triethlyamine hydrochloride residue. This results in liberation of the amine which can then be distilled off leaving behind an aqueous solution of sodium chloride.

Among the tertiary amines which may be utilized in accordance with my invention may be mentioned piperidine, methyl piperidine, triethyl amine, trimethyl amine and picoline. Other tertiary amines such as pyridine and n-methyl morpholine, dimethyl, ethyl amine, diethyl methyl amine, may also be utilized with satisfactory results. Alpha-lutidine and 2,4- 2,6- or 3,4-lutidine are also satisfactory. Various other aliphatic, aromatic, or heterocyclic tertiary amines may also be utilized, it being essential only that the tertiary amine used form an azeotrope boiling at a temperature substantially above the boiling point of the compound which it is desired to recover.

I prefer to use triethylamine since it is easily available, economical, and efficient in the operation of my process, and I have found that uniformly high yields of product are obtained when this tertiary amine is utilized. Moreover, triethylamine may be readily recovered and re-utilized in the process of my invention.

The following table shows the boiling point and the ratio of amine to acid for several of the high boiling azeotropes which may be utilized in accordance with my invention:

| Azeotrope | Ratio Amine:acid | Boiling Point (Atmospheric) |
|---|---|---|
| | | ° C. |
| Pyridine—acetic acid | 2:3 | 139–141 |
| Picoline—acetic acid | 2:3 | 145 |
| Triethylamine—acetic acid | 1:4 | 162 |
| Trimethylamine—acetic acid | 1:4 | 148–150 |
| Pyridine—propionic acid | 1:3 | 148–150 |
| Pyridine—formic acid | 1:3 | 150–151 |

The optimum results are ordinarily obtained in accordance with my invention by utilizing sufficient amounts of the tertiary amine to form an azeotrope with all of the acid present in the mixture. However, the amount of tertiary amine utilized may be varied with satisfactory results and in some cases this may be preferable. For instance, in the recovery of 1-cyanobutadiene-1,3, I have found that it is desirable to maintain a slight excess of acetic acid since in this case a small amount of acetic acid serves somewhat to stabilize the 1-cyanobutadiene-1,3 against polymerization. Thus, for example, I have found that in the recovery of this compound a ratio of slightly less than 1 mole triethylamine to 4 moles of acetic acid is preferable for optimum results. Suitable variations in the ratio will be apparent to those skilled in the art in applying the process of my invention to the recovery of various compounds from mixtures containing acetic acid.

The following examples illustrate my invention:

Example 1

1-cyanobutadiene-1,3 (200 g.) containing approximately 43.2% acetic acid was placed in a still connected to a fractionating column. Triethylamine (51.6 g.) was added to the mixture which was then distilled at 20 mm. mercury pressure. A yield of 106.7 g. of 1-cyanobutadiene-1,3 which represents a 94% yield based on the known cyanobutadiene content of the original mixture was obtained.

Example 2

Crude 1-cyanobutadiene-1,3 (1810 g.) obtained by pyrolysis of crotonaldehyde cyanhydrin acetate was placed in a still equipped with a fractionating column. The theoretical cyanobutadiene content of the crude mixture containing acetic acid was 956 g. or 56.8% of the mixture. Triethylamine (300 g.) was added to the crude product, and the mixture then distilled at 20 mm. mercury pressure. 1-cyanobutadiene-1,3 (816 g.) boiling at 46.5 to 47.5° C. was obtained, representing a yield of 86.5% of the amount theoretically present in the crude mixture.

Compounds other than 1-cyanobutadiene-1,3 may be recovered in accordance with my novel process. For example, vinyl cyanide may be readily separated from mixtures with acetic acid by this process. However, my process is especially useful in the recovery of compounds which have boiling points close to or somewhat above the boiling point of the acid and which cannot easily be recovered by conventional means. 1-cyanobutadiene-1,3 and higher analogues, thereof, are representative of this class of compounds.

The process is simple, efficient, convenient, and economical. It requires no special type of equipment and avoids the necessity for the prolonged heating of the product which it is desired to recover during distillation of acetic acid in the first stage. My process results in increased yields of product since hydrolysis, polymerization and formation of undesirable by-products are substantially eliminated. Thus, my invention provides a very practical method for the recovery of chemical products from mixtures containing acetic acid.

Thus, although I have described my process primarily with respect to the recovery of 1-cyanobutadiene-1,3 from mixtures of this compound with acetic acid, utilizing triethylamine which forms an azeotrope with acetic acid, my invention includes within the scope thereof a process for the recovery of other compounds utilizing tertiary amines other than triethylamine which form high boiling azeotropes with carboxylic acids such as acetic, formic, and propionic acid.

I claim:

1. A method for the recovery of 1-cyanobutadiene-1,3 from a mixture containing acetic acid impurity which comprises adding triethylamine to said mixture and distilling a fraction consisting essentially of 1-cyanobutadiene-1,3 from the resulting mixture.

2. A method for the recovery of 1-cyanobutadiene-1,3 from a mixture containing acetic acid impurity which comprises adding to said mixture triethylamine in an amount sufficient to form an azeotrope with substantially all of said acetic acid and distilling a fraction consisting essentially of 1-cyanobutadiene-1,3 from the resulting mixture.

VIRGIL L. HANSLEY.

REFERENCES CITED

The following references are of record in the file of this patent:

UNITED STATES PATENTS

| Number | Name | Date |
|---|---|---|
| 1,919,850 | Luscher | July 25, 1933 |
| 2,034,332 | Dragendorff | Mar. 17, 1936 |
| 2,264,025 | Gudgeon et al. | Nov. 25, 1941 |
| 2,357,412 | Levesque | Sept. 5, 1944 |

OTHER REFERENCES

Young, Distillation Principles and Processes, published 1922 by Macmillan and Co. Ltd., St. Martin's St., London. (Copy in Div. 6.) Page 54.